US008655923B2

(12) United States Patent
Zurek et al.

(10) Patent No.: US 8,655,923 B2
(45) Date of Patent: Feb. 18, 2014

(54) SIMPLE AGGREGATE MODE FOR TRANSACTIONAL DATA

(75) Inventors: Thomas F. Zurek, Walldorf (DE); Klaus Nagel, Heidelberg (DE); Stefan Unnebrink, Neckargemuend (DE)

(73) Assignee: SAP AG, Walldorf (DE)

( * ) Notice: Subject to any disclaimer, the term of this patent is extended or adjusted under 35 U.S.C. 154(b) by 1030 days.

(21) Appl. No.: 12/339,788

(22) Filed: Dec. 19, 2008

(65) Prior Publication Data
US 2010/0161677 A1 Jun. 24, 2010

(51) Int. Cl.
*G06F 7/00* (2006.01)
*G06F 17/30* (2006.01)

(52) U.S. Cl.
USPC .......................................... 707/803; 707/694

(58) Field of Classification Search
USPC .................................................. 707/694, 803
See application file for complete search history.

(56) References Cited

U.S. PATENT DOCUMENTS

| | | | |
|---|---|---|---|
| 6,205,451 B1 * | 3/2001 | Norcott et al. ......................... 1/1 |
| 6,763,352 B2 * | 7/2004 | Cochrane et al. ..................... 1/1 |
| 6,983,291 B1 * | 1/2006 | Cochrane et al. ............. 707/625 |
| 7,020,649 B2 * | 3/2006 | Cochrane et al. ..................... 1/1 |
| 7,024,414 B2 * | 4/2006 | Sah et al. ................................ 1/1 |
| 2002/0099563 A1 * | 7/2002 | Adendorff et al. ................. 705/1 |
| 2003/0149702 A1 * | 8/2003 | Saffer et al. .................... 707/102 |
| 2004/0199519 A1 * | 10/2004 | Gu et al. ........................ 707/100 |
| 2005/0050083 A1 * | 3/2005 | Jin et al. ......................... 707/102 |
| 2005/0125325 A1 * | 6/2005 | Chai et al. ........................ 705/35 |
| 2006/0080277 A1 * | 4/2006 | Nador ............................... 707/1 |
| 2006/0288045 A1 * | 12/2006 | Raz ................................ 707/200 |
| 2009/0299969 A1 * | 12/2009 | Le ..................................... 707/3 |

* cited by examiner

*Primary Examiner* — Shew-Fen Lin
(74) *Attorney, Agent, or Firm* — Fish & Richardson P.C.

(57) ABSTRACT

This disclosure provides various software and systems for efficiently maintaining aggregates. In one aspect, a system performing a computer implemented method identifies a first change to transactional data in a business application and automatically adds an aggregate record to an aggregate data structure based on the first change. The system then identifies a second change to the transactional data in the business application, the second change comprising an update to key figures associated with the first change. The system can prohibit an update to the aggregate record in the aggregate data structure based on the second change and automatically adds a second aggregate record to the aggregate data structure based on the second change to the transactional data, where the second aggregate record comprises the update to the key figures.

23 Claims, 6 Drawing Sheets

302↘

| Year | Month | Region | Country | Product | Product Grp. | Quantity in PC | Profit in $ |
|---|---|---|---|---|---|---|---|
| 1998 | 011998 | DE-NORTH | DE | PAINT | OFFICE | 730 | 6763 |
| 1998 | 011998 | DE-NORTH | DE | PAINT | OFFICE | 390 | 2614 |
| 1998 | 011998 | DE-NORTH | DE | PAINT | OFFICE | 780 | 3866 |
| 1998 | 011998 | DE-NORTH | DE | WIN-OS | OS | 970 | -3734 |
| 1998 | 011998 | IT-NORTH | IT | WIN-OS | OS | 190 | 1355 |
| 1998 | 011998 | IT-NORTH | IT | WIN-OS | OS | 810 | 7565 |
| 1998 | 011998 | IT-NORTH | IT | PC-3 | PC | 250 | -861 |
| 1998 | 011998 | IT-NORTH | IT | PC-3 | PC | 40 | -44 |
| 1998 | 011998 | IT-NORTH | IT | PC-3 | PC | 160 | -503 |
| 1998 | 011998 | DE-SOUTH | DE | PC-3 | PC | 50 | 18 |
| 1998 | 011998 | DE-SOUTH | DE | PC-3 | PC | 990 | 6468 |

304, 306, 308, 332, 334

320↘ 326

| Year | Month | Region | Country | Product | Product Grp. | Quantity in PC | Profit in $ |
|---|---|---|---|---|---|---|---|
| 1998 | 011998 | DE-NORTH | DE | PAINT | OFFICE | 1900 | 13243 |
| 1998 | 011998 | DE-NORTH | DE | WIN-OS | OS | 970 | -3734 |
| 1998 | 011998 | IT-NORTH | IT | WIN-OS | OS | 1000 | 8920 |
| 1998 | 011998 | IT-NORTH | IT | PC-3 | PC | 450 | -1408 |
| 1998 | 011998 | DE-SOUTH | DE | PC-3 | PC | 1040 | 6486 |

| Year | Month | Region | Country | Product | Product Grp. | Quantity in PC | Profit in $ |
|---|---|---|---|---|---|---|---|
| 1998 | 011998 | DE-NORTH | DE | PAINT | OFFICE | 1900 | 13243 |
| 1998 | 011998 | DE-NORTH | DE | WIN-OS | OS | 970 | -3734 |
| 1998 | 011998 | IT-NORTH | IT | WIN-OS | OS | 1000 | 8920 |
| 1998 | 011998 | IT-NORTH | IT | PC-3 | PC | 450 | -1408 |
| 1998 | 011998 | DE-SOUTH | DE | PC-3 | PC | 1040 | 6486 |
| 1998 | 011998 | DE-SOUTH | DE | PC-3 | PC | 200 | 450 |
| 1998 | 011998 | DE-SOUTH | DE | PC-3 | PC | 110 | 320 |

FIG. 3B

| Year | Month | Region | Country | Product | Product Grp. | Quantity in PC | Profit in $ |
|---|---|---|---|---|---|---|---|
| 1998 | 011998 | DE-NORTH | DE | PAINT | OFFICE | 1900 | 13243 |
| 1998 | 011998 | DE-NORTH | DE | WIN-OS | OS | 970 | -3734 |
| 1998 | 011998 | IT-NORTH | IT | WIN-OS | OS | 1000 | 8920 |
| 1998 | 011998 | IT-NORTH | IT | PC-3 | PC | 450 | -1408 |
| 1998 | 011998 | DE-SOUTH | DE | PC-3 | PC | 1350 | 7186 |

FIG. 3C

SIMPLE AGGREGATE MODE FOR TRANSACTIONAL DATA

TECHNICAL FIELD

This disclosure relates to computer systems and methods for data management within a business environment and, more particularly, to methods, systems, and software for efficiently maintaining aggregate data structures.

BACKGROUND

Reporting and analytics applications frequently use abstractions, shortened records, or other aggregate forms of transactional business data. Business data may include key figures data, which can be data that may be aggregated using an appropriate function. For example, sales totals for a particular time period can be summed, or a minimum and maximum daily sales total can be calculated. In another example, pricing information can be extracted from larger transactional data structures and be stored in a more efficient aggregate table for reporting. In many environments, key figures data can be grouped by one or more items of information which can be referred to as characteristic data. For example, sales totals can be grouped by sales person, sales region, product, etc., and aggregated sales totals can be calculated for each characteristic grouping. Business reports can include aggregated data, and reporting performance may be improved if aggregate data is retrieved from a precalculated aggregate structure. Business reports may also include master, or non-transactional data.

SUMMARY

This disclosure provides various embodiments of software and systems for efficiently maintaining aggregates. In one aspect, a system can execute or perform a computer implemented method that identifies a first change to transactional data in a business application and automatically adds an aggregate record to an aggregate data structure based on the first change. The system then identifies a second change to the transactional data in the business application, the second change comprising an update to key figures associated with the first change. The system prohibits an update to the aggregate record in the aggregate data structure based on the second change and, instead, automatically adds a second aggregate record to the aggregate data structure based on the second change to the transactional data, where the second aggregate record comprises the update to the key figures.

In another aspect, the system identifies a first change to a second set of transactional data in the business application and automatically adds an aggregate record to a second aggregate data structure based on the change. The system then identifies a second change to the second set of transactional data in the business application, where the second change comprises an update to key figures associated with the first change. The system then determines a mode associated with the second set of transactional data and based on this determination, automatically updates the aggregate record in the second aggregate data structure based on the second change, where the second aggregate record comprises the update to the key figures.

Implementations may include one or more of the following features. The transactional data may comprise an infocube and the prohibition may occur after determining an aggregate mode. The mode may be associated with the business application, with a particular set of transactional data, and/or with a mode switch capable of being toggled. The first and second aggregate records may be automatically merged in the aggregate data structure according to a schedule, where the schedule may establish a reorganization schedule for the aggregate data structure according to lower usage estimations. A change to master data associated with the transactional data may be identified, and at least one record in the aggregate data structure may be updated based on this master data change. The aggregate data structure may be populated based on an initial processing of the transactional data, and the aggregate data structure may be populated from the transactional data and a second set of data, such as a set of master data or a second set of transactional data.

The details of these and other aspects and embodiments of the disclosure are set forth in the accompanying drawings and the description below. Other features, objects, and advantages of the various embodiments will be apparent from the description and drawings, as well as from the claims.

DESCRIPTION OF DRAWINGS

FIGS. 3A-3C illustrate example aggregate data structures for use by an appropriate system, such as the system described in FIG. 1;

DETAILED DESCRIPTION

Figure 1:
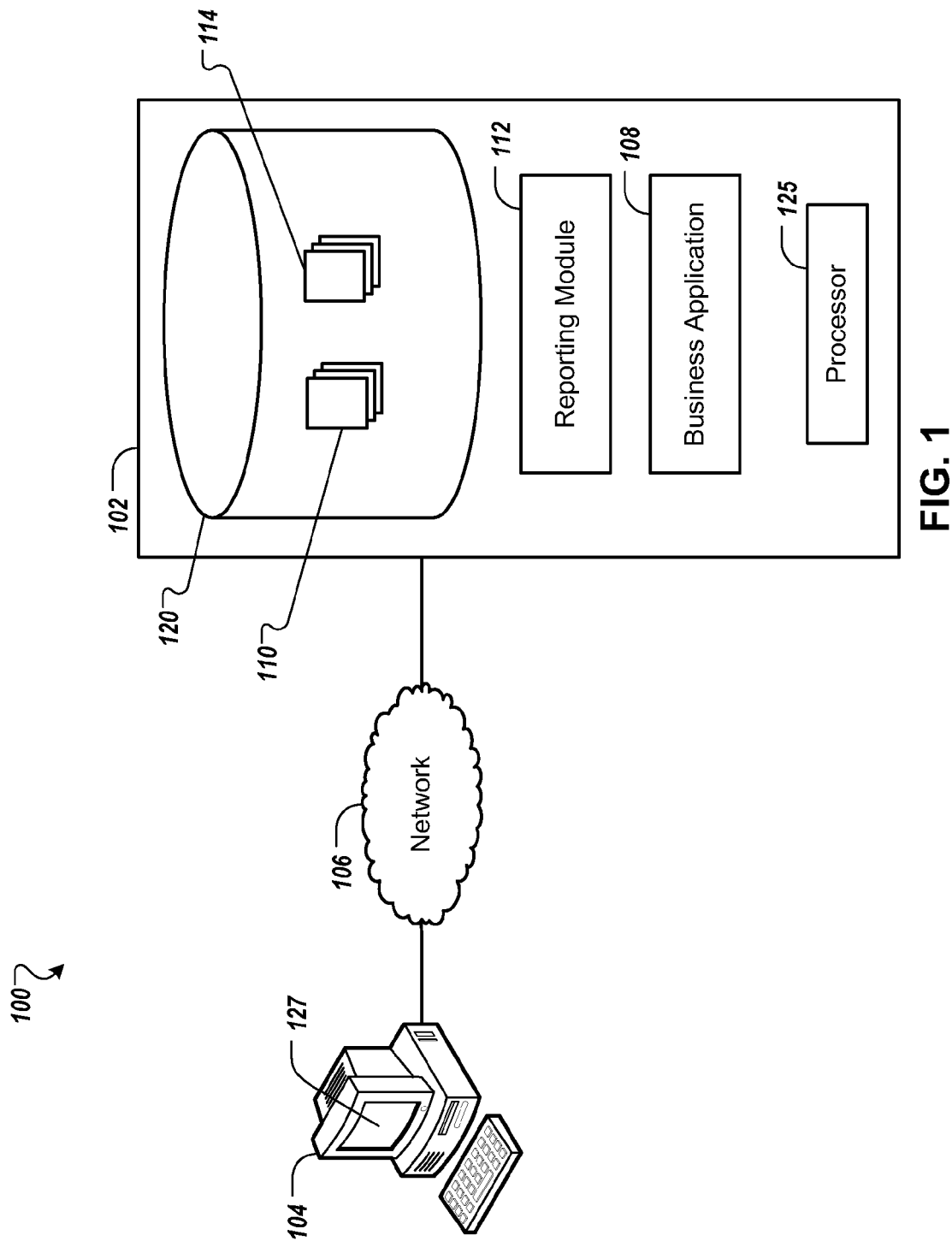
FIG. 1 illustrates an example business environment implementing various features of aggregate data structure maintenance within the context of the present disclosure.

This disclosure relates to computer systems and methods for maintaining aggregate data structures within a business environment 100. For example, FIG. 1 illustrates one example business environment 100 that implements a business application 108. The business application 108 can be, for example, a pricing, inventory, sales order, or other business application, and may include various reporting capabilities. Business reports can include aggregated data, and reporting performance may be improved if aggregate data is retrieved from a precalculated aggregate data structure. Such aggregation often occurs, whether directly or indirectly, using commutative aggregation function such as, for example, SUM, MIN, MAX, etc. A pre-calculated aggregate data structure imposes some overhead, however, due to maintenance of the aggregate data structure as underlying (transactional and master data) data changes occur. In certain configurations, total cost of ownership of this system, or its underlying aggregates or reporting structures, can be reduced or simplified if a mode is enforced where only new records are allowed to be added to an aggregate data structure. Such a mode can minimize total cost of ownership by avoiding expensive, frequent recalculations of aggregate values. Incremental, occasional maintenance and reorganization of aggregate data structures can be performed during periods of low system usage. For example, smaller businesses may appreciate having a mode that allows them to reduce the processing overhead of maintaining reporting aggregates. In another example, a business may desire to reduce the processing overhead of aggregates related to transactional data that is changed quite often, thereby hitting aggregate structures quite often. This example business may not enforce the aggregate mode for data that is relatively more static. In another example, a mode may be implemented that allows the user or administrator to prohibit the definition and creation of certain aggregate structures and allow only certain aggregate structures for which the cannot occur by nature.

Turning to the illustrated example, the business environment 100 includes or is communicably coupled with server 102 and one or more clients 104, at least some of which communicate across network 106. Server 102 comprises an electronic computing device operable to receive, transmit, process and store data associated with environment 100. FIG. 1 provides merely one example of computers that may be used with the disclosure. Each computer is generally intended to encompass any suitable processing device. For example, although FIG. 1 illustrates one server 102 that may be used with the disclosure, environment 100 can be implemented using computers other than servers, as well as a server pool. Indeed, server 102 may be any computer or processing device such as, for example, a blade server, general purpose personal computer (PC), Macintosh, workstation, Unix-based computer, or any other suitable device. In other words, the present disclosure contemplates computers other than general purpose computers as well as computers without conventional operating systems. Server 102 may be adapted to execute any operating system including Linux, UNIX, Windows Server, or any other suitable operating system. According to one embodiment, server 102 may also include or be communicably coupled with a web server.

The illustrated server 102 includes one or more processors 125. The processor 125 may be a central processing unit (CPU), a blade, an application specific integrated circuit (ASIC), or a field-programmable gate array (FPGA). The processor 125 may execute instructions and manipulate data to perform the operations of server 102. Although FIG. 1 illustrates one processor 125 in server 102, only one or more than one processor may be used according to particular needs or desires of environment 100. In the illustrated embodiment, processor 125 executes or interfaces with software, such as the business application 108, reporting module, or other software. Regardless of the particular implementation, "software" may include computer-readable instructions, firmware, wired or programmed hardware, or any combination thereof on tangible medium as appropriate. Indeed, each software component may be fully or partially written or described in any appropriate computer language including C, C++, Java, Visual Basic, assembler, Perl, any suitable version of 4GL, as well as others. It will be understood that while the applications illustrated in FIG. 1 is shown as individual modules that implement the various features and functionality through various objects, methods, or other processes, the applications may instead include a number of sub-modules, third-party services, components, libraries, and such, as appropriate. Conversely, the features and functionality of various components can be combined into single components as appropriate.

The server 102 includes a business application 108. In some instances, a business application may execute or provide a number of application services, including customer relationship management (CRM) systems, human resources management (HRM) systems, financial management (FM) systems, project management (PM) systems, knowledge management (KM) systems, and electronic file and mail systems. The business application may be operable to exchange data with a plurality of enterprise-based systems and, in the process, update or modify one or more content repositories. The various services performed may allow the business application to orchestrate one or more business processes in synchronization with other processes that directly or indirectly affect the information stored within one or more of the content repositories. For instance, the business application may drive business processes across different applications, systems, technologies, and organizations, thus driving end-to-end business processes across heterogeneous systems or subsystems. The business application 108 can be, for example, a pricing, inventory, sales order, or other business application. The business application 108 can produce and/or receive transactional data 110. For example, transactional data 110 can include pricing changes, sales orders, financial transactions, or any other business transactional data. The business application 108 can produce, receive, process, or otherwise be associated with transactional data 110. For example, transactional data 110 can include pricing changes, sales orders, financial transactions, or any other business transactional data.

The business application 108 can use a reporting module 112 to generate reports. Generated reports can be displayed on the client 104. Reports can include transactional data 110 and can also include aggregated data 114. The aggregated data 114 can be populated from the transactional data 110, and can include grouped data. The aggregated data can include one or more key figures columns, which can each store an aggregated data value associated with a group of data. The aggregated data 114 can be populated from multiple sets of transactional data. The aggregated data 114 can be maintained in response to changes in the transactional data 110. Both data 110 and 114 may be formatted, stored, or defined as various data structures in relational database tables, business objects, eXtensible Markup Language (XML) documents, text files, Virtual Storage Access Method (VSAM) files, flat files, Btrieve files, comma-separated-value (CSV) files, internal variables, one or more libraries, or any other format capable of storing or presenting all or a portion of the interface, process, data, and other models or modeling domains. In short, each data structure (110 or 114) may comprise one table or file or a plurality of tables or files stored on one computer or across a plurality of computers in any appropriate format as described above. Indeed, some or all of the particular structure may be local or remote without departing from the scope of this disclosure and store any type of appropriate data.

For example, The transactional data 110 and aggregated data 114 can be stored in memory 120. Memory 120 represents any memory or database module and may take the form of volatile or non-volatile memory including, without limitation, magnetic media, optical media, random access memory (RAM), read-only memory (ROM), removable media, or any other suitable local or remote memory components. Memory 120 may also include any other appropriate data such as data classes, object interfaces, unillustrated software applications or sub-systems, and so on.

The network 106 facilitates wireless and/or wireline communication between the server 102 and any other local or remote computer, such as the client 104. The network 106 may be all or a portion of an enterprise or secured network. In another example, a portion of network 106 may be a virtual private network (VPN) merely between the server 102 and the client 104 across a wireline or wireless link. Such an example wireless link may be via 802.11a, 802.11b, 802.11g, 802.20, WiMax, and many others. In another example, network 106 may include an intranet and the internet In other words, the network 106 encompasses any internal or external network, networks, sub-network, or combination thereof (whether physical or logical) operable to facilitate communications between various computing components in the system. The network 106 may communicate, for example, Internet Protocol (IP) packets, Frame Relay frames, Asynchronous Transfer Mode (ATM) cells, voice, video, data, and other suitable information between network addresses. The network 106 may include one or more local area networks (LANs), radio access networks (RANs), metropolitan area networks (MANs), wide area networks (WANs), all or a portion of the global computer network known as the Internet, and/or any other communication system or systems at one or more locations. In certain embodiments, the network 106 may be a secure network associated with the enterprise and certain local or remote archives, source code repositories, databases, or clients.

Client 104 is any computing device operable to connect or communicate with server 102 or network 112 using any communication link. At a high level, each client 104 can include or execute GUI 127 and comprises an electronic computing device operable to receive, transmit, process and store any appropriate data associated with environment 100, typically via one or more applications such as business application 108. It will be understood that there may be any number of clients 104 communicably coupled to server 102. Further, "client 104" and "user" may be used interchangeably as appropriate without departing from the scope of this disclosure. Moreover, for ease of illustration, each client 104 is described in terms of being used by one user. But this disclosure contemplates that many users may use one computer or that one user may use multiple computers. As used in this disclosure, client 104 is intended to encompass a personal computer, touch screen terminal, workstation, network computer, kiosk, wireless data port, smart phone, personal data assistant (PDA), one or more processors within these or other devices, or any other suitable processing device. For example, client 104 may be a PDA operable to wirelessly connect with external or unsecured network. In another example, client 104 may comprise a laptop that includes an input device, such as a keypad, touch screen, mouse, or other device that can accept information, and an output device that conveys information associated with the operation of server 102 or clients 104, including digital data, visual information, or GUI 127. Both the input device and output device may include fixed or removable storage media such as a magnetic computer disk, CD-ROM, or other suitable media to both receive input from and provide output to users of clients 104.

GUI 127 comprises a graphical user interface operable to allow the user of client 104 to interface with at least a portion of environment 100 for any suitable purpose, such as viewing application, reporting, or analytic data. Generally, GUI 127 provides the particular user with an efficient and user-friendly presentation of data provided by or communicated within environment 100. More specifically, GUI 127 can be the front-end or administrator view of business application 108. For example, the GUI 127 an allow an administrator to configure one or more mode settings which can affect maintenance of the aggregate data 114. In another example, GUI 127 may present an interface for running and displaying reports. In yet another example, GUI 127 may present an analytics application.

In some cases, GUI 127 may comprise a web browser that includes a plurality of customizable frames or views having interactive fields, pull-down lists, and buttons operated by the user. GUI 127 may also present a plurality of portals or dashboards. It should be understood that the term "graphical user interface" may be used in the singular or in the plural to describe one or more graphical user interfaces and each of the displays of a particular graphical user interface. Indeed, reference to GUI 127 may indicate a reference to the front-end or a component of any application or software, as well as the particular interface accessible via client 104, as appropriate, without departing from the scope of this disclosure. Therefore, GUI 127 contemplates any graphical user interface, such as a generic web browser or touchscreen, that processes information in environment 100 and efficiently presents the results to the user. Server 102 can accept data from client 104 via the web browser (e.g., Microsoft Internet Explorer or Mozilla Firefox) and return the appropriate HTML or XML responses to the browser using network 106.

In one aspect of operation, client 104 (or a user using the client) may perform some business process using the business application, in this case illustrated as executing on server 102. As the business process occurs, transactional data may be changed. This transactional data may be one or more sets of structured data, unstructured data, or stored in any other format. If aggregation is enabled and the changing transactional data is associated with an aggregate data structure, then the aggregate structure is updated, often according to an aggregation mode. This mode may determine whether an existing aggregate record is updated or if a new record reflecting the transaction data change is added to the aggregate data structure, which may take less processing time than updating an existing record.

Figure 2:
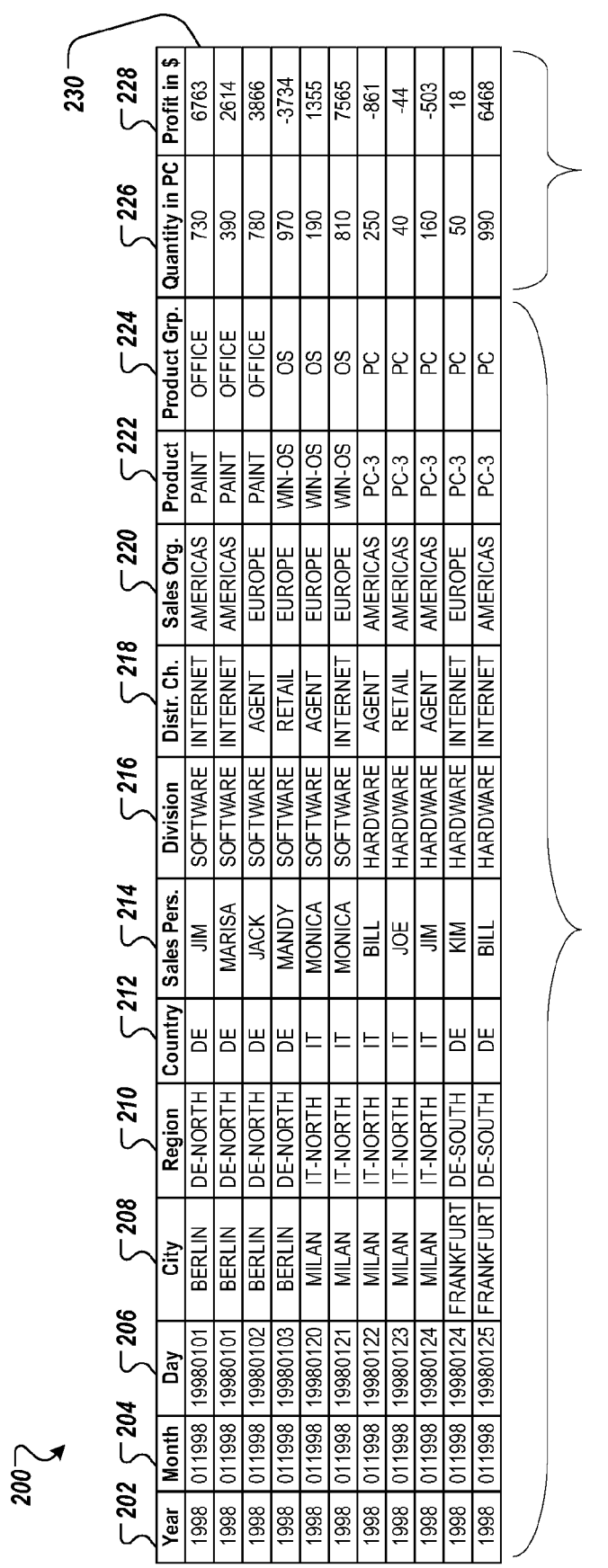
FIG. 2 illustrates an example infocube for use by an appropriate system, such as the system described in FIG. 1.

FIG. 2 illustrates an example infocube 200. The infocube 200 is a tabular structure which can store transactional data. The infocube 200 can represent, for example, the transactional data 110 of FIG. 1. Transactional data can be produced or received by business applications such as inventory, sales, and pricing applications, to name a few examples. The infocube 200 can store transactional data in rows and columns. For example, it can be considered as a tabular structure where one or more columns are considered as GROUP BY columns (in the sense used in example SQL)—those columns can be denoted as characteristics—and a number of columns whose values can be aggregated using a function such as SUM, MIN, MAX, AVG, COUNT, COUNT DISTINCT, etc.—those columns can be denoted as key figures. Of course, while key figures typically hold numeric values, other data types may be stored as well, such as strings that can be an option such that a properly defined aggregation function can be defined on top of such a data type.

Turning to the illustrated example, infocube 200 includes columns 202-228, which can store information related to year, month, day, city, region, country, sales person, division, distribution channel, sales organization, product, product group, quantity, and profit, respectively. For each row in the infocube 200, a value can be stored for each column 202-228. For example, a row 230 has a value of "1998" for the year column 202, a value of "011998" for the month column 204, a value of "19980101" for the day column 206, a value of "BERLIN" for the city column 208, a value of "DE-NORTH" for the region column 210, a value of "DE" for the country column 212, a value of "JIM" for the sales person column 214, a value of "SOFTWARE" for the division column 216, a value of "INTERNET" for the distribution channel column 218, a value of "AMERICAS" for the sales organization column 220, a value of "PAINT" for the product column 222, a value of "OFFICE' for the product group column 224, a value of "730" for the quantity column 226, and a value of "6763" for the profit column 228.

Each column 202-228 can be classified as a characteristic column or as a key figures column. For example, columns 202-224 can be considered characteristic columns and columns 226-228 can be considered as key figures columns. Key figures columns can include quantifiable values that can be aggregated using a function. For example, a key figures column may include numeric values, and the numeric values may be aggregated using a sum, minimum value, maximum value, average value, or count function, to name a few examples. A key figures column may include data of data types other than numeric data types, such as dates.

Characteristics columns, in contrast, can represent a classification of key figures. Characteristic columns can represent categories and subcategories by which the rows in the infocube 200 can be sorted and/or grouped. For example, rows in the infocube 200 can be grouped and/or sorted by city, region, sales person, or a combination of these or other columns.

For example, FIG. 3A illustrates an example table 302 in which rows are grouped by year, month, region, country, product, and product group. The table 302 can be produced, for example, from the infocube 200, such as by omitting day, city, sales person, distribution channel, division and sales organization columns. Columns may be omitted for example, if they are not needed for reporting purposes.

The omission of columns from a table or infocube can result in a situation where multiple rows in the reduced table have a set of characteristic columns with identical values. For example, rows 304-308 of the table 302 have identical values for the year, month, region, country, product, and product group columns. Rows with identical values in characteristic columns can be merged (e.g., aggregated together), and each corresponding set of key figures value can be aggregated into a single value.

For example, an aggregate data structure 320 illustrates the aggregation of rows from the table 302. For instance, the rows 304-308 from the table 302 have been aggregated into a single row 322 in the aggregate data structure 320. The row 322 includes a value of "1900" 324 for the quantity column, which is equal to the sum of the quantity values "730", "390", and "780" of the rows 304-308, respectively. Similarly, the row 322 includes a value of "13243" 326 for the profit column, which is equal to the sum of the profit values "6763", "2614", and "3866" of the rows 304-308, respectively. As another example of aggregation, the aggregate data structure 320 includes a row 330, which represents the merging of the rows 332-334 from the table 302.

An aggregate data structure, such as the aggregate data structure 320, can be persisted. Persisted aggregate data structures can be used for various purposes, such as for reporting and analytics. An aggregate data structure can be initially populated based on the processing of an infocube. For example, as mentioned, records of an infocube can be grouped by characteristics columns, and key figures values for rows with identical characteristics values can be aggregated. One or more columns of an infocube may be omitted when populating an aggregate data structure based on an infocube. An aggregate data structure can also be populated from multiple tables or infocubes. For example, an aggregate data structure can be populated from multiple sets of transactional data or from a combination of transactional data and master data.

An aggregate data structure can improve query response time, such as if a query uses only characteristics that are all available in an aggregate data structure. Retrieving data from the aggregate data structure rather than from an infocube can improve query response time due to the smaller size and precalculated aggregation of the aggregate data structure. An aggregate data structure can result in overhead processing, however, due to necessary updates and maintenance of aggregate data structures when underlying transactional data changes.

Various approaches can be used to update aggregate data structures when transactional data changes. For example, when transactional data changes, all corresponding aggregate data structures can be located and key figure values in records associated with the changed transactional data can be recalculated. For example, in an inventory tracking application, if units of a product are sold, all corresponding aggregate data structures which include an associated inventory total can be located and updated to reflect an updated inventory total.

In some applications, however, it may be prohibitively time consuming to recalculate key figures of aggregate data structures every time a change to transactional data occurs. For example, price changes in a pricing application may occur frequently, and it may be prohibitively expensive to update and recalculate aggregate records every time a price changes.

Rather than update existing aggregate data structure records every time a transaction occurs, an approach can be used where a new record is automatically added to associated aggregate data structures in response to a transactional data change. For example, in certain configurations, this incremental update may utilize commutative aggregation functions. Added records can be merged with related, existing records at a later time, and updated key figure values can be recalculated and stored in an updated aggregate record. For example, FIG. 3B illustrates an aggregate data structure 350 which has the same contents as the aggregate data structure 320 except for the addition of rows 354-356. Row 354 may have been added, for example, due to a transaction of a sale of 200 units of the product "PC-3". Adding the row 354 may result in a cost savings as compared to finding and updating the existing associated record 358 and recalculating the quantity and profit columns. If another transaction occurs, such as the sale of 110 units of the product "PC-3", another row, such as row 356, can be added to the aggregate data structure 350.

On a periodic basis, such as on an automatically scheduled basis or as a result of an administrator running a batch process, related records in an aggregate data structure (i.e., records having identical characteristic values) can be merged and updated key figures values can be calculated. The merging process can occur, for example, during periods of low system usage.

For example, FIG. 3C illustrates an aggregate data structure 370 which includes a row 372. The row 372 is a result of merging the rows 354-358 of the aggregate data structure 350. The row 372 is an updated aggregate record, which includes updated quantity 374 and profit 376 values (e.g., the value 374 is equal to the sum of the quantity values in the rows 354-358 and the value 376 is equal to the sum of the profit values in the rows 354-358).

A query request may be received before the merging process is completed (e.g., before the creation of the row 372). Query processing can dynamically merge associated aggregate data structure records if needed. For example, query processing can dynamically calculate the value "1350" as the aggregate quantity value associated with the rows 354-358. Similarly, query processing can dynamically calculate the value "7186" as the aggregate profit value associated with the rows 354-358.

A mode setting can be checked to determine whether to update an existing aggregate record or to add a new aggregate record in response to a transactional data change. The mode can be application-based. For example, for some applications, such as applications where data changes frequently (e.g., a pricing application), it can be desirable to set the mode so as to not update existing aggregate records in response to a transactional data change. For other applications, such as for applications where data changes infrequently (e.g., an employee data records application), it can be desirable to set the mode so as to automatically update existing aggregate records in response to a transactional data change.

The mode can be toggled (e.g., set to alternate states at different points in time). An administrator can set an initial mode setting and can toggle the mode to an alternate setting. For example, the mode may be reconfigured after analyzing frequency of data changes for a set of transactional data.

Figure 4:
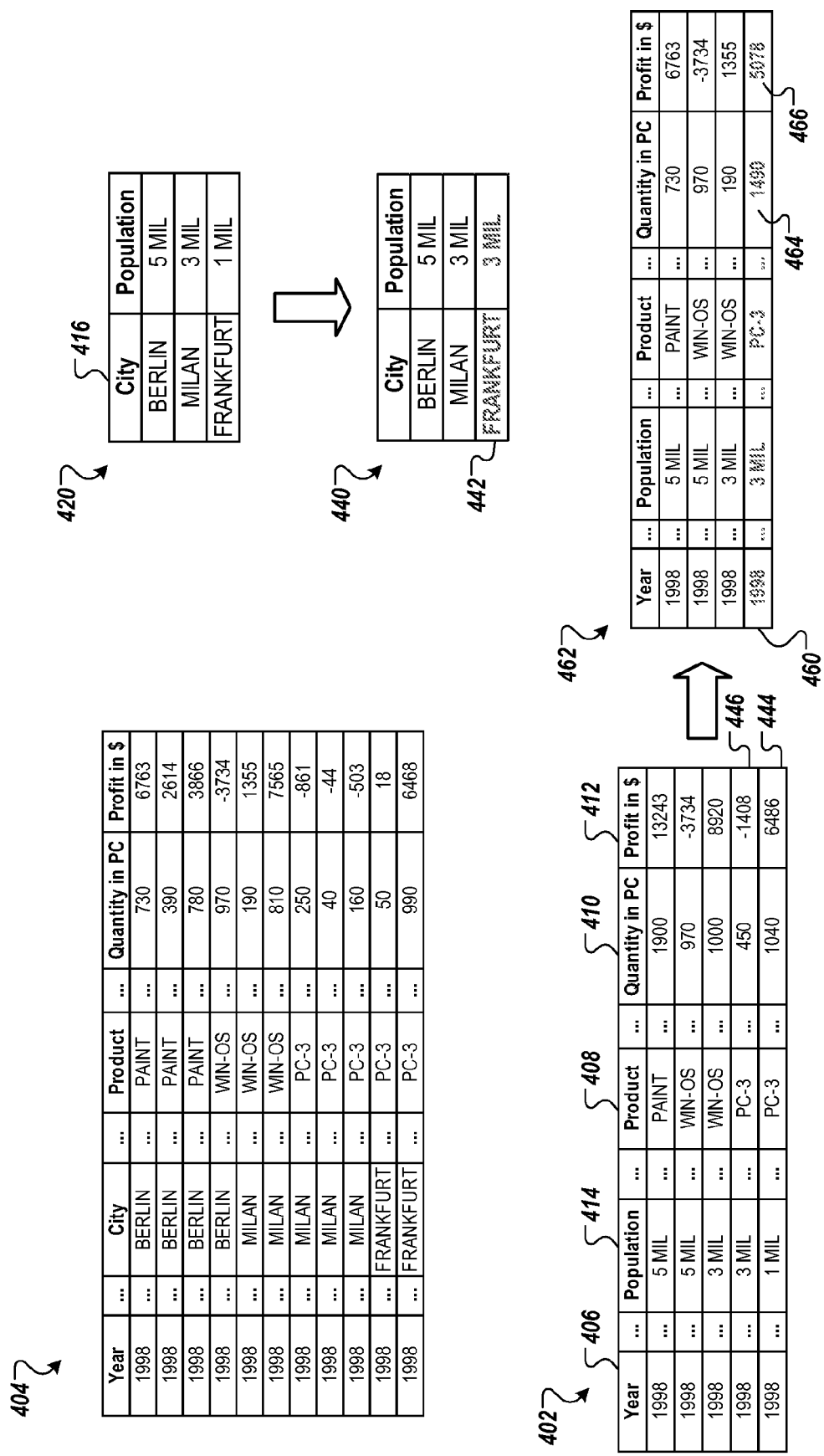
FIG. 4 illustrates updating an example aggregate data structure based on a change to master data.

FIG. 4 illustrates an aggregate data structure 402 which is based in part on master data. The aggregate data structure 402 is based on an infocube 404. The aggregate data structure 402 includes a year column 406 and a product column 408 (and possibly other columns) from the infocube 404. Key figures columns 410 (quantity) and 412 (profit) are also included in the aggregate data structure 402. The aggregate data structure 402 also includes a population column 414.

The population column 414 originates from a city column 416 included in a master data table 420. The master data table 420 maps city names to population values. The population is an example of a master data attribute. A city's population (i.e. attributes in general) can change, as illustrated in an updated master data table 440. The updated master data table 440 includes a row 442, which stores an updated population value of 3 million for the city of Frankfurt (a change from an earlier population value of 1 million).

A change in master data can result in changes to aggregate data structures that are based on attributes, i.e. on master data, like the aggregate data structure 402 which incorporates the attribute population 414 from the master data table (420 and 440). For example, if a mode is set to update existing aggregate records, a row 444 in the aggregate data structure 402 associated with the old population value for Frankfurt can be updated to be associated with the new population value of 3 million. The updated row 444 can be merged with existing row 446, as illustrated by a row 460 of an updated aggregate data structure 462. The row 460 includes an updated quantity value 464 and an updated profit value 466.

In certain situations, the mode may prohibit situations that involve updating an aggregate structure based on master data changes or certain transactional data changes. For example, this mode may not allow the definition or creation of aggregate structures that would be updated in response to master data changes, including attributes change and hierarchies change.

Figure 5:
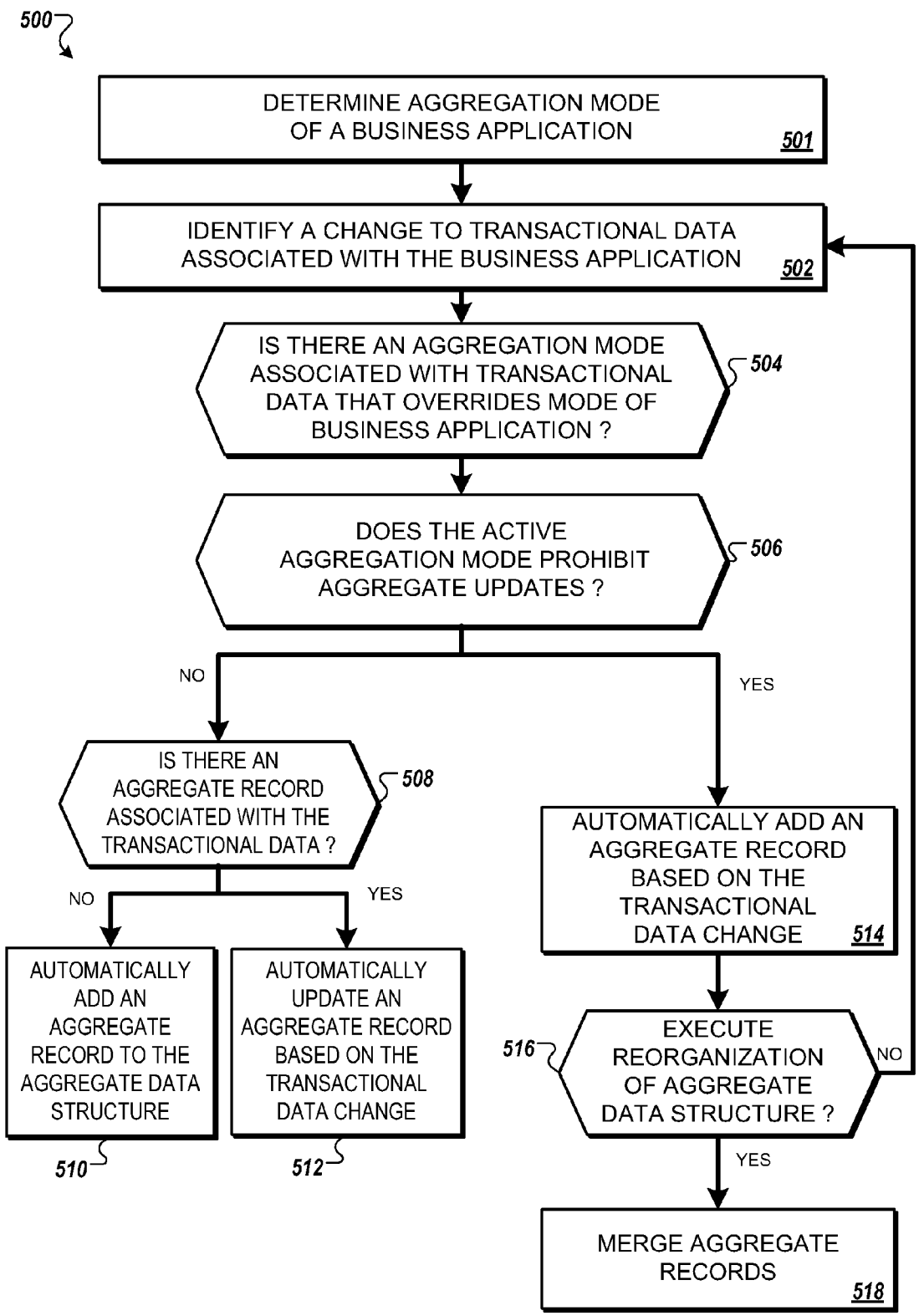
FIG. 5 illustrates an example flowchart depicting one process for maintaining aggregate data structures within a particular implementation of the present disclosure.

FIG. 5 illustrates an example flowchart depicting a process 500 for maintaining an aggregate data structure within a particular implementation of the present disclosure. Generally, process 500 involves either adding a new aggregate record or updating an existing aggregate record, based on a mode setting. Specifically, process 500 begins at step 501, where an aggregation mode of a business application is determined. For example, an aggregation mode of the business application 108 (FIG. 1) can be determined. For example, a mode setting can be queried, where the mode setting indicates whether, in response to a change in transactional data, to update an existing associated aggregate record or to add a new aggregate data record. For example, for some applications, such as applications where data changes frequently (e.g., a pricing application), a mode may be configured so that existing aggregate records are not updated in response to a transactional data change. For other applications, such as for applications where data changes infrequently (e.g., an employee data records application), a mode may be configured so that existing aggregate records are automatically updated in response to a transactional data change.

Next, at step 502, a change to transactional data in a business application is identified. For example, a change to transactional data 110 (FIG. 1) may occur due to a change in price of a product. It can then be determined whether an aggregation mode associated with transactional data overrides an aggregation mode of the business application at step 504. For example, a pricing application may have an associated mode which prohibits updates to aggregate data records. However, a set of transactional data which changes infrequently, such as a set of product descriptions, may have an associated mode setting which indicates that existing associated aggregate data structure records are to be automatically updated in response to a transactional data change to the set of product descriptions. In such implementations, such a mode associated with a set of transactional data can override a mode associated with a business or business application instance.

At step 506, it is determined whether the active aggregation mode prohibits aggregate updates. For example, an aggregation mode of a business application may either allow or prohibit aggregate updates. As discussed above, an aggregation mode associated with transactional data may override the aggregation mode of the business application. For example, an aggregation mode of associated with transactional data may prohibit updates to aggregate records, overriding an aggregation mode of the business application which allows aggregate updates.

If the active aggregation mode does not prohibit updating aggregate records, it is determined, in step 508, whether there is an aggregate record associated with the transactional data. For example, an aggregate data structure associated with the transactional data can be searched to determine whether a record exists in the aggregate data structure which has the same set of characteristic data as the changed transactional data.

If there is not an aggregate record associated with the transactional data, then, in step 510, an aggregate record is automatically added to the aggregate data structure. For example, an aggregate record can be added to the aggregate data structure, where the characteristic data and key figures values are populated from the transactional data.

If there is an aggregate record associated with the transactional data, then, in step 512, an aggregate record is automatically updated based on the transactional data change. For instance, in the example of FIG. 3A, if row 304 of the table 302 is modified so that the current quantity value of "730" is changed to a new value of "740" (e.g., suppose that a business transaction occurred where a previously entered, erroneous quantity value was corrected), the corresponding row 322 in the aggregate data structure 320 can be automatically changed to include a recalculated aggregate quantity value of "1910" (e.g., the new, updated quantity value of "1910" can replace the old quantity value "1900" 324 in the row 322).

If, at step 506, it is determined that the active aggregation mode prohibits aggregate updates, then, in step 514, an aggregate record is automatically added to the aggregate data structure based on the transactional data change. For instance, in the example of FIG. 3B, the row 354 in the aggregate data structure 350 illustrates the addition of a row to the aggregate data structure 350 in response to a change in transactional data.

Next, in step 516, it is determined whether to execute reorganization of the aggregate data structure. This reorganization can often be accomplished using database reorganization techniques. In one circumstance, the aggregate data structure may be dropped, related records merged to create one unique based on transactional data primary keys, and then reloaded. For example, aggregate records can be merged on a periodic basis, such as on an automatically scheduled basis or as a result of an administrator running a batch process. A merging process can occur, for example, during periods of low system usage, such as nights, weekends, holidays, or on calendar basis (e.g. quarterly). The determination in step 516 can include, for example, determining whether a scheduled time to merge has occurred, or whether a batch process has been initiated.

If it is not time to execute reorganization of the aggregate data structure, step 502 is performed and the next change to transactional data is identified. If it is time to execute reorganization of the aggregate data structure, then, in step 518, aggregate records are merged. For example, related records in an aggregate data structure (i.e., records having identical characteristic values) can be merged and updated key figures values can be recalculated. For instance, in the example of FIGS. 3B-3C, the aggregate data structure 370 includes a row 372 which is the result of merging the rows 354-358 of the aggregate data structure 350. The row 372 is an updated aggregate record, which includes updated quantity 374 and profit 376 values (e.g., the value 374 is equal to the sum of the quantity values in the rows 354-358 and the value 376 is equal to the sum of the profit values in the rows 354-358).

The preceding figures and accompanying description illustrate processes and implementable techniques. But environment 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the steps in these processes may take place simultaneously and/or in different orders than as shown. Moreover, environment 100 may use processes with additional steps, fewer steps, and/or different steps, so long as the methods remain appropriate. For example, the reorganization processing illustrated in FIG. 5 may not (and often would not) occur after every transactional data change, but instead would often run at periods of low activity.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer implemented method for maintaining aggregates comprising:
identifying a first change to transactional data in a business application, the first change affecting a first key figure of a first transactional record in the transactional data, the first transactional record having a first characteristic;
automatically adding a first aggregate record to an aggregate data structure based on the first change to the transactional data, the first aggregate record including an aggregation of the first key figure and a second key figure of a second transaction record in the transactional data, the second transaction having the first characteristic;
identifying a second change to the transactional data in the business application, the second change comprising an update to the second key figure of the second transaction record;
determining that an aggregation mode prohibits aggregate updates to the aggregation of the first key figure and the second key figure included in the first aggregate record of the aggregate data structure; and
in response to determining that the aggregate mode prohibits aggregate updates:
prohibiting an update to the first aggregate record in the aggregate data structure based on the second change; and
automatically adding a second aggregate record distinct from the first aggregate record to the aggregate data structure based on the second change to the transactional data, the second aggregate record comprising the update to the second key figure of the second transaction record in the transactional data.

2. The method of claim 1, the transactional data comprising an infocube.

3. The method of claim 1, the aggregation mode associated with the business application.

4. The method of claim 1, the aggregation mode associated with a mode switch capable of being toggled.

5. The method of claim 1, the aggregation mode associated with a particular set of transactional data.

6. The method of claim 1, further comprising:
identifying a third change to a second set of transactional data in the business application;
automatically adding a second aggregate record to a second aggregate data structure based on the third change to the second set of transactional data;
identifying a fourth change to the second set of transactional data in the business application, the fourth change comprising an update to key figures associated with the third change;
determining whether a different aggregation mode associated with the second set of transactional data prohibits aggregate updates for the second set of transactional data; and
in response to determining that the different aggregation mode does not prohibit aggregate updates, automatically updating the second aggregate record in the second aggregate data structure based on the fourth change to the second set of transactional data, the second aggregate record comprising the update to the key figures associated with the third change.

7. The method of claim 1, further comprising automatically merging the first aggregate record and the second aggregate record in the aggregate data structure according to a schedule.

8. The method of claim 1, further comprising:
identifying a change to master data associated with the transactional data; and
updating at least one record in the aggregate data structure based on this master data change.

9. The method of claim 1 further comprising populating the aggregate data structure based on an initial processing of the transactional data.

10. The method of claim 9, the aggregate data structure populated from the transactional data and a second set of data comprising one of the following:
a set of master data; or
a second set of transactional data.

11. A computer program product comprising a tangible non-transitory computer readable storage medium with instructions operable when executed to:
identify a first change to transactional data in a business application, the first change affecting a first key figure of a first transactional record in the transactional data, the first transactional record having a first characteristic;
automatically add a first aggregate record to an aggregate data structure based on the first change to the transactional data, the first aggregate record including an aggregation of the first key figure and a second key figure of a second transaction record in the transactional data, the second transaction having the first characteristic;

identify a second change to the transactional data in the business application, the second change comprising an update to the second key figure of the second transaction record;

determine that an aggregation mode prohibits aggregate updates to the aggregation of the first key figure and the second key figure included in the first aggregate record of the aggregate data structure; and in response to determining that the aggregate mode prohibits aggregate updates:

prohibit an update to the first aggregate record in the aggregate data structure based on the second change; and automatically add a second aggregate record distinct from the first aggregate record to the aggregate data structure based on the second change to the transactional data, the second aggregate record comprising the update to the second key figure of the second transaction record in the transactional data.

12. The computer program product of claim 11, the transactional data comprising an infocube.

13. The computer program product of claim 11, the aggregation mode associated with the business application.

14. The computer program product of claim 11, the aggregation mode associated with a mode switch capable of being toggled.

15. The computer program product of claim 11, the aggregation mode associated with a particular set of transactional data.

16. The computer program product of claim 11, the instructions further operable to:

identify a third change to a second set of transactional data in the business application;

automatically add a second aggregate record to a second aggregate data structure based on the third change to the second set of transactional data;

identify a fourth change to the second set of transactional data in the business application, the fourth change comprising an update to key figures associated with the third change;

determine whether a different aggregation mode associated with the second set of transactional data prohibits aggregate updates for the second set of transactional data; and in response to determining that the different aggregation mode does not prohibit aggregate updates, automatically update the second aggregate record in the second aggregate data structure based on the fourth change to the second set of transactional data, the second aggregate record comprising the update to the key figures associated with the third change.

17. The computer program product of claim 11, the instructions further operable to automatically merge the first aggregate record and the second aggregate record in the aggregate data structure according to a schedule.

18. The computer program product of claim 17, the schedule establishing a reorganization schedule for the aggregate data structure according to lower usage estimations.

19. The computer program product of claim 11, the instructions further operable to:

identify a change to master data associated with the transactional data; and update at least one record in the aggregate data structure based on this master data change.

20. The computer program product of claim 11, the instructions further operable to populate the aggregate data structure based on an initial processing of the transactional data.

21. The computer program product of claim 20, the aggregate data structure populated from the transactional data and a second set of data.

22. The computer program product of claim 21, the second set of data comprising one of the following:

a set of master data; or a second set of transactional data.

23. The computer program product of claim 11, the aggregation utilizing at least one commutative aggregation function.

* * * * *